Dec. 5, 1933. A. W. SIMON ET AL 1,937,721
APPARATUS FOR MEASURING DUST CONCENTRATION
Filed Sept. 5, 1929 3 Sheets-Sheet 3

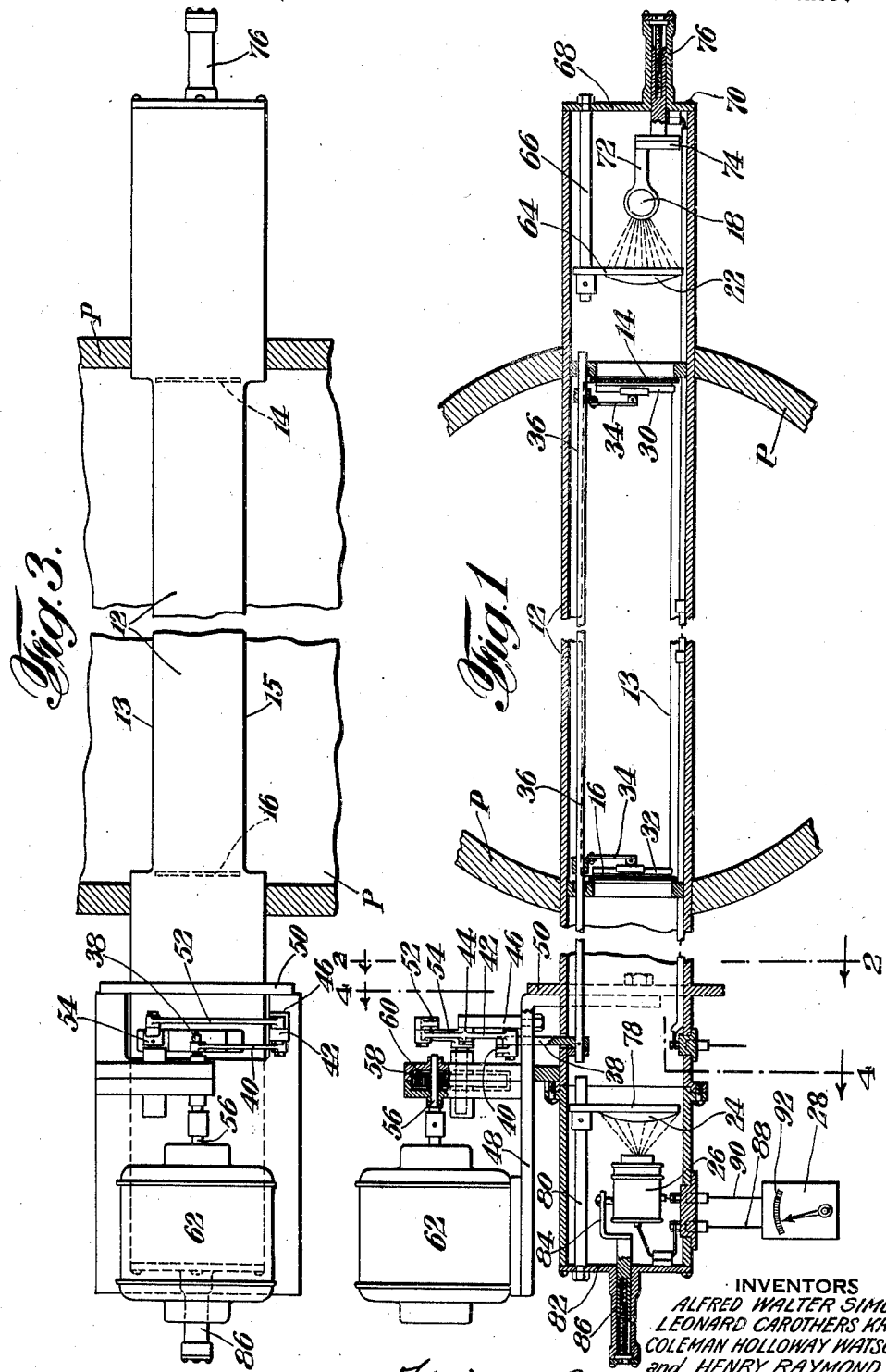

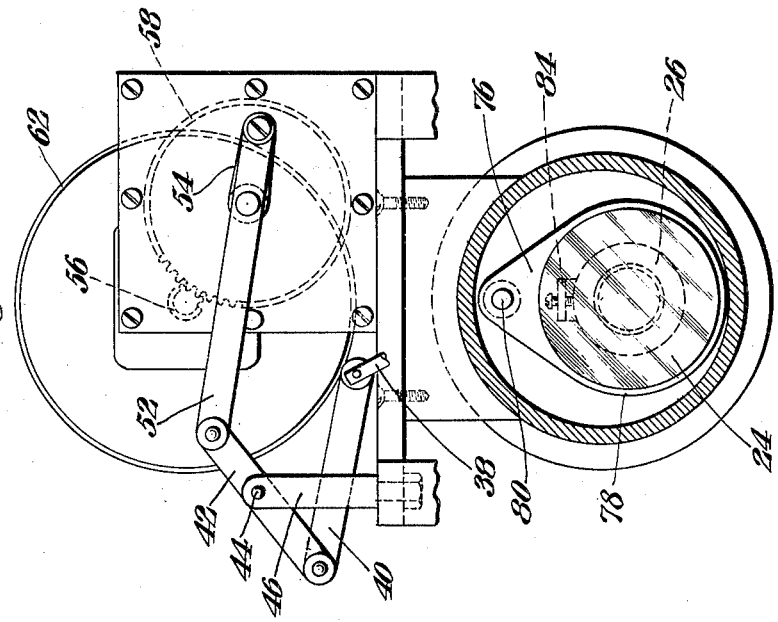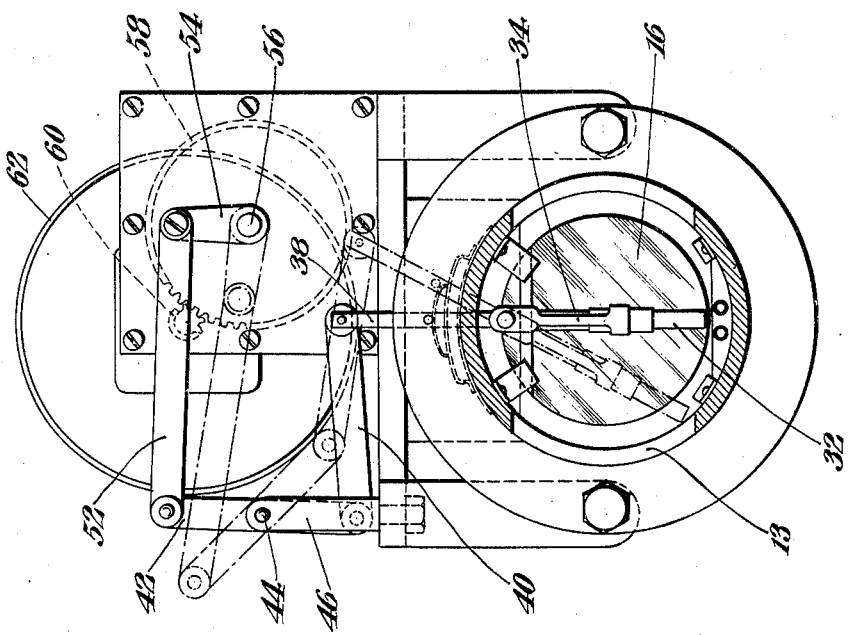

INVENTORS
ALFRED WALTER SIMON,
LEONARD CAROTHERS KRON,
COLEMAN HOLLOWAY WATSON,
and HENRY RAYMOND.
BY Usina & Rauber
ATTORNEYS Patented Dec. 5, 1933

1,937,721

UNITED STATES PATENT OFFICE 1,937,721

APPARATUS FOR MEASURING DUST CONCENTRATION

Alfred Walter Simon, Birmingham, Leonard Carothers Kron and Coleman Holloway Watson, Ensley, and Henry Raymond, Pratt City, Ala.

Application September 5, 1929. Serial No. 390,634

12 Claims. (Cl. 88—14)

This invention relates to an improved apparatus for measuring the dust content of gas. While not limited thereto the apparatus is well adapted for use in determining the dust concentration of blast furnace gas.

Our improved apparatus is based on the fundamental proposition, that if a beam of light of constant intensity is passed through a dust laden gas, the amount of light absorbed and consequently the amount of light transmitted depends on the concentration of the dust in the gas. That is, if the dust concentration is high, a great deal of light is absorbed and very little is transmitted, on the other hand, if the gas is relatively clean very little light is absorbed and nearly all of it is transmitted.

It has been heretofore proposed to pass a beam of light through smoke so as to determine the density thereof. But such smoke density meters cannot be depended upon to accurately indicate dust concentration because they are not designed so that the beam of light passes through a fixed constant distance, moreover, the smoke density meters, which have come under our observation, are incorrectly calibrated.

Our invention will be fully apparent from the following detailed disclosure when read in connection with the accompanying drawings, in which:—

Fig. 1 is a longitudinal section through an apparatus embodying certain features of the invention;

Fig. 2 is a cross section on line 2—2 of Fig. 1;

Fig. 3 is a plan view of the apparatus of Fig. 1;

Fig. 4 is a section on line 4—4 of Fig. 1.

Figure 5:
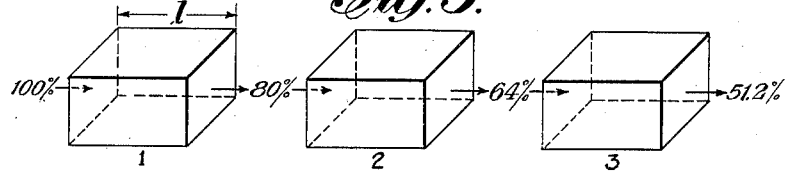
Fig. 5 is a diagram illustrating certain principles involved in light absorption with respect to the distance traversed in a dust laden gas.

Referring first to the law concerning light absorption or transmission through a dust laden gas, assume we have a parallelopiped of a length $l$ and a cross section A, (Fig. 5) which contains a gas holding a certain concentration of dust in suspension. Let a parallel beam of light pass through this gas in the direction of $l$ and covering the area A. The dust in the gas over the path $l$ will then absorb a certain fraction of the light, let us say in a particular case 20%, and transmit the remainder, or 80%. If now a second parallelopiped just like the first is placed behind it so that the light after emerging from the first enters and passes through the second, then the second will absorb 20% of the light entering it or 20% of 80%, i. e. 16% of the original light, leaving 64% of the original light to emerge from the second. If now a third parallelopiped is added it will absorb 20% of the light falling on it, or 20% of 64%, i. e. 12.8% of the original light, leaving 51.2% emerging from the third; and so on. All this it must be borne in mind for the case that each one of the parallelopipeds is exactly alike and contains the same concentration of dust. To make it clearer these results are shown again in the following table:

|   | Incident | Absorbed | Emergent |
|---|---|---|---|
|   | Percent | Percent | Percent |
| 1 | 100 | 20 | 80 |
| 2 | 80 | 16 | 64 |
| 3 | 64 | 12.8 | 51.2 |

Hence it is immediately clear that the percentage of light absorbed depends on the distance traversed, but is not directly proportional to it since successive equal intervals $l$ absorb the same fraction of the light entering them but a continually smaller and smaller fraction of the total light. Hence it is important in our meter to have the light always traverse the same distance.

Now taking parallelopipeds 1 and 2, suppose all the gas in 2 is compressed together with its dust into 1, i. e. suppose the concentration of dust in 1 is doubled. It is obvious that 1 will now absorb as much light as 1 and 2 together did previously, i. e. a total of 20% plus 16% or 36%. Similarly if the gas in 3 is now added also to 1, tripling the concentration of dust in 1, a total of 20% plus 16% plus 12.8% or 48.8% is now absorbed in 1, according to the table:

| Concentration | Absorbed | Emergent |
|---|---|---|
|   | Percent | Percent |
| 1 | 20 | 80 |
| 2 | 36 | 64 |
| 3 | 48.8 | 51.2 |

From the table it is seen that doubling the concentration does not double the percentage of light absorbed, and increasing the concentration to three times does not triple the percentage absorbed.

We have ascertained that mathematically speaking the transmitted light varies with the concentration and have determined that for a constant length of path $l$ the concentration is proportional to the logarithm of the ratio of incident to emergent light. Our conclusions have been checked both by calculation and experiment and have been found correct. We have discovered that in order to secure reliable data concerning the concentration of dust laden gas by a method involving projecting a beam of light through the gas that it is absolutely essential that the beam of light traverse a constant distance through the dust laden gas and that substantial constant uniformity of transparency be maintained in the optical system of the device.

Figure 6:
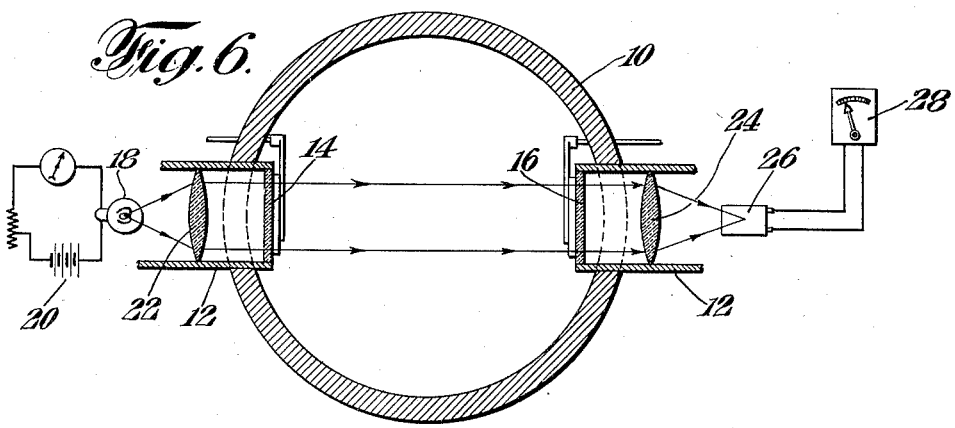
Fig. 6 is a diagram illustrating certain principles of the invention.

The principle of the invention is illustrated diagrammatically in Fig. 6, wherein 10 represents a pipe through which dust laden gas is flowing. Projecting into opposite sides of the pipe are casing members 12—12 closed at their inner ends by transparent windows 14 and 16. Beyond the window 14 there is a source of light in the form of a small lamp 18 connected with a suitable source of electrical energy indicated at 20. The beam of light passes through a lens 22, which renders the light from the filament parallel. This beam passes through the window 14 across the gas flowing between the two windows 14 and 16. The light which leaves the window 16 passes through a second lens 24 and is focused thereby on a suitable light sensitive element 26 such as a photoelectric cell or a thermopile. This thermopile is electrically connected with a suitable recording meter 28, which meter is calibrated accurately to read in terms of dust concentration. The calibration of the meter is based on the mathematical equation that the dust concentration is proportional to the logarithm of the ratio of incident to emergent light. This enables us to so calibrate the meter 28 that if desired, we can secure a direct reading in terms of grains of dust per cubic feet of gas.

The apparatus may take various physical forms. One form of the apparatus, which has shown good results in actual operation, is illustrated in detail in Figs. 1 to 4 inclusive.

Referring to these figures, 12 is a casing, which has slots 13 and 15 formed therein at diametrically opposite sides. Transparent windows 14 and 16 are supported within the casing, the inner faces of the windows coinciding with the ends of the slots 13 and 15. As thus arranged the stream of dust laden gas passes through an orifice, which is of fixed constant length, the ends of these orifices being defined by the windows 14 and 16. It is important, for the purpose of accuracy of reading, that the gas measured always traverse a fixed distance and that the beam of light always traverse a fixed constant distance. The arrangement of the slotted casing and windows juxtaposed thereto will assure that this condition may be maintained in the device.

It is also important, to secure accuracy of reading, that uniformity of transparency be maintained. To this end we provide wipers 30 and 32, which are mounted for coaction respectively with the windows 14 and 16. These wipers are carried by arms 34—34 secured to a longitudinally extending shaft 36, which shaft is rotatably mounted in suitable bearings secured to the casing as shown.

Near one end the shaft 36 carries an arm 38, which is connected by a link 40 with a lever 42 pivoted at 44 to a bracket 46 carried by a base plate 48 secured to a flange 50 carried by the casing 12.

The lever 42 is connected by link 52 with a crank 54 secured to a stub shaft 56, which carries a gear 58 arranged to be driven by pinion 60 secured to the armature shaft of a motor 62. As thus arranged it is clear that the rotation of the armature shaft of the motor will cause the wipers 30 and 32 to sweep the inner faces of the windows 14 and 16 and thereby prevent the precipitation of dust thereon.

At the right end of the casing 12, beyond the window 14, there is a convex condensing lens 22. The lens 22 is carried by a rim 64 secured to a supporting rod 66, which is in turn carried by an end plate 68 secured to the casing by small screws 70. Between the end plate 68 and the lens 22 is a small electric lamp 18 supported by a lamp holder 72, which in turn is secured to a lamp board 74 forming part of the fitting indicated as a whole at 76. This fitting is of any suitable standard form adapted to convey current to the lamp supported by the holder 72.

Located beyond the window 16 and enclosed by the casing and therefore isolated from the gas stream is a lens 24 adapted to receive the emergent beam of light passed through the dust laden gas. This lens is carried in a ring 78 fastened to a supporting rod 80 projecting inwardly from an end plate 82. Located between the end plate 82 and the lens 24 is a thermopile 26, which is secured to a bracket 84 carried by a fitting 86. The thermopile is connected by conductors 88 and 90 with the recording meter 28, which is calibrated, as indicated at 92, in terms of dust concentration.

In the arrangement shown and described it is to be particularly noted that the gas whose dust content is to be determined passes through a space in which the transparent windows 14 and 16 form enclosures. It is therefore clear that the distance travelled by the light beam through the dust laden gas is constant. It is also clear that the windows 14 and 16 physically isolate the lenses 22 and 24 from the gas stream, hence there is no danger of the efficiency of the lenses being impaired by the precipitation of dust particles thereon. The windows also prevent dust particles from forming on the light globe 18 or from interfering with the proper functioning of the thermopile 26 or other light sensitive element.

The motor driven window wiping mechanism as above described prevents the accumulation of dust on the windows and insures that substantially uniform transparency is maintained.

In the apparatus of Figs. 1 to 4 the casing 12 will project through suitable openings formed in diametrically opposite sides of a gas main P. Preferably the space between the inner surface of the windows 14 and 16 will correspond substantially or approximately to the inside diameter of the gas main.

Figure 7:
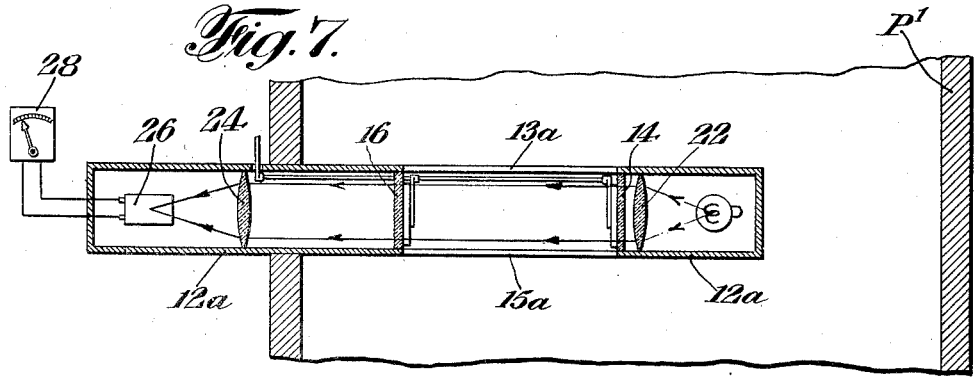
Fig. 7 is a similar diagram illustrating a modified application of the invention.

The construction illustrated in Figs. 1 to 4 inclusive corresponds to an installation actually used in determining the dust content of gases coming from certain blast furnaces operated in the Birmingham iron and steel district. However, we are not limited to this exact construction. Various modifications embodying the invention may be resorted to. For example in Fig. 7 we have illustrated diagrammatically an application of the invention wherein the casing $12^a$ projects part way into a gas pipe P' of large diameter.

In this arrangement the gas will flow through the slots 13ᵃ and 15ᵃ between the windows 14 and 16.

Figure 8:
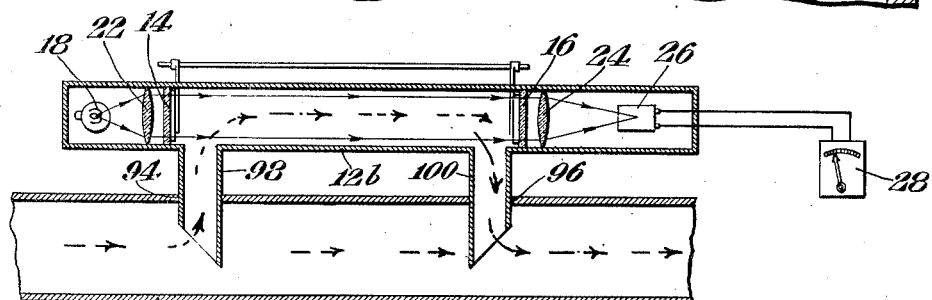
Fig. 8 is a diagram illustrating a further modification.

In Fig. 8 we have illustrated a slightly modified application of the invention wherein the gas main P² carrying the dust laden gas is apertured at 94 and 96 for the reception of conduits 98 and 100, which communicate with the casing 12ᵇ. This casing is provided with windows 14 and 16 also with lamp 18 and lenses 22 and 24 and a light sensitive element 26, which controls a meter 28 calibrated to indicate dust content. In this arrangement part of the dirty gas will be shunted through the conduits 98 and 100 the flow being indicated by the dotted arrows in the figure.

From the foregoing it is clear that the beam of light from the small lamp traverses a constant fixed distance through the gas stream flowing between the transparent windows 14 and 16. A certain amount of the light is absorbed depending upon the concentration of dust and gas. The emergent beam acts on the thermopile or other light sensitive element, which in turn controls the meter, which is calibrated to read in accurate terms of dust concentration.

In some cases, the lenses described may be omitted, in which case the beam of light will traverse the distance between the fixed windows. Or, the windows themselves may be in the form of lenses such as plano-convex lenses. Alternatively in place of the lenses a parabolic reflector could be used behind the light so as to concentrate the rays projected across the fixed distance between the windows.

In the foregoing description, for ease of expression and for the sake of simplicity, we have used the word "light" throughout. It is to be understood, however, that the meter is responsive to both visible light and heat rays. That is to say, the sensitive element is responsive to radiation. When a thermopile is used, as described, we utilize both visible light and heat rays. Such light and heat rays are both radiation and differ only in wave length. A photoelectric cell may be used in place of a thermopile in which case only visible light rays are utilized. It is to be understood that, if desired, we may utilize heat rays alone by substituting a hot, but not visibly hot, element for the lamp. In the claims the term "light" is to be understood as meaning either light or heat rays.

While the apparatus described is particularly adapted for use in determining dust concentration, the invention is also adapted for use in measuring suspended materials of various characters. The apparatus can be used for smoke, or fume, or can be used to record the concentration of a partially opaque gas such as chlorine. It can also be used to record the concentration of liquid droplets, such as tar in suspension, etc. The term "dust" as used herein, therefore, is to be construed in a general, rather than a limiting, sense and is intended to apply to smoke, fume, tar and various other suspended materials.

While we have described with great particularity certain specific details of the embodiments of the invention illustrated it is not to be construed that we are limited thereto since various changes may be made by those skilled in the art without departing from the invention as defined in the appended claims.

What we claim is:

1. An apparatus of the class described including an elongated hollow casing having longitudinally extending slots formed therein for the passage of dust laden gas, windows within the casing whose inner faces register with the ends of the slots in the casing, a lens and a light, means for supporting said lens and light within the casing beyond one of said windows, a light sensitive element and means for supporting the same within said casing beyond the other window.

2. An apparatus of the class described including an elongated hollow casing having longitudinally extending slots formed therein for the passage of dust laden gas, windows within the casing whose inner faces register with the ends of the slots in the casing, a lens and a light, means for supporting said lens and light within the casing beyond said windows, a lens and a thermopile within the casing beyond the other window, means for supporting the last named lens and said thermopile.

3. An apparatus of the class described including an elongated hollow casing having longitudinally extending slots formed therein for the passage of dust laden gas, windows within the casing whose inner faces register with the ends of the slots in the casing, a lens and a light, means for supporting said lens and light within the casing beyond one of said windows, a thermopile and means for supporting the same within said casing beyond the other window, respective wiping elements mounted for movement in juxtaposition to each of said windows and means for actuating said wiping elements.

4. An apparatus of the class described including an elongated casing slotted to permit the passage of gas transversely therethrough, windows limiting the size of the gas stream passing through said casing, a slight source supported within the casing beyond one of said windows, a thermopile supported within the casing beyond the other window, respective wipers mounted for coaction with each of said windows, a motor and other transmission elements for actuating both wipers.

5. An apparatus of the class described including an elongated slotted casing having windows whose inner faces are in substantial alignment with the ends of the slotted portion of the casing, wipers mounted for coaction with said windows and means for actuating said wipers.

6. An apparatus of the class described comprising an elongated casing having diametrically opposite longitudinal slots formed therein, windows in substantial alignment with the ends of said slots, respective wipers adjacent said windows, a supporting shaft for said wipers and motor and transmission elements for rocking said shaft.

7. Apparatus of the class described comprising a pair of spaced radiation transparent windows, means to pass a flowing gas stream therebetween, mechanically operative wiper means to maintain the faces of said windows adjacent said gas stream substantially free from radiation absorbing deposits from the said gas stream, means to project a beam of radiation through one window across said gas stream and through the second window, means to concentrate the emergent radiation upon a radiation sensitive device, and means utilizing the variations in the current flow in said radiation sensitive device in response to the variations in the said emergent radiation to indicate the variations in the density of said flowing gases.

8. Apparatus of the class described comprising a pair of spaced radiation transparent windows, means to conduct a flowing gas stream therebetween and means to continuously record the density of said gases, said means including a light source disposed beyond one of said windows and means to project said light radiation through the window across the moving gas stream and through the other window, mechanically operative wiper means to continuously maintain the faces of said windows adjacent the flowing gas stream substantially free from radiation absorbing deposits, means to concentrate the light radiation emerging from the second window upon a light sensitive device, and means to utilize the variations in the current flow in said light sensitive device incident to variations in the intensity of the emergent light radiation concentrated thereon to operate an indicator device.

9. Apparatus of the class described including an elongated hollow casing having longitudinally extending slots formed therein for the passage of dust laden gas, windows within the casing whose inner faces register with the ends of the slots in the casing, means to maintain the window faces adjacent the gas stream substantially free from radiation absorbing deposits, a lens and a light, means for supporting said lens and light within the casing beyond one of said windows, a light sensitive element and means for supporting the same within said casing beyond the other window, an indicator device and an electrical circuit including said light sensitive element and indicator device.

10. A smoke meter device comprising an elongated hollow casing having a pair of interiorly disposed light transparent windows dividing the casing into a central smoke chamber and two end chambers, conduit means to pass smoke into and out of said central chamber, a light source disposed in one of said end chambers and a lens adapted to project the light from said source through the said windows the length of said smoke chamber, a light sensitive device disposed in the other end chamber and a lens to focus the light radiation traversing said smoke chamber and windows upon said light sensitive device, mechanically operative wiping means to maintain the inner faces of said windows substantially free from light absorbing depositing material from the smoke, a meter device and an electrical circuit including said meter device and the light sensitive device.

11. A dust concentration meter device comprising a chamber, means to pass smoke laden gases into and out of said chamber, two radiation transparent windows disposed in opposite walls of said chamber between which the smoke laden gases are conducted, means to continuously remove radiation absorbing deposits and condensates from the inside faces of the windows to maintain the inside faces of said windows of substantially uniform transparency, means disposed adjacent one of said windows and exteriorly of said chamber to project radiation through said window into said chamber and through the opposite window, radiation sensitive means disposed adjacent the said opposite window and exteriorly of said chamber to receive the projected radiation, and means to measure the amount of said received radiation.

12. A dust concentration meter device comprising a chamber, means to pass smoke laden gases into and out of said chamber, two radiation transparent windows disposed in opposite walls of said chamber between which the smoke laden gases are conducted, wiper means to maintain the inside faces of said windows substantially free from radiation absorbing deposits, means to mechanically operate said wiper means, means disposed adjacent one of said windows and exteriorly of said chamber to project radiation through said window into said chamber and through the opposite window, radiation sensitive means disposed adjacent the said opposite window and exteriorly of said chamber to receive the projected radiation, and means to measure the amount of said received radiation.

ALFRED WALTER SIMON.
LEONARD CAROTHERS KRON.
COLEMAN HOLLOWAY WATSON.
HENRY RAYMOND.